(No Model.)

R. HAAG.
WINE OR BEER FILTERING APPARATUS.

No. 518,102. Patented Apr. 10, 1894.

Attest:
G. M. Lamasure
F. H. Schott

Inventor
Robert Haag
by Max Bergji
Atty.

THE NATIONAL LITHOGRAPHING COMPANY,
WASHINGTON, D. C.

UNITED STATES PATENT OFFICE.

ROBERT HAAG, OF STUTTGART, GERMANY.

WINE OR BEER FILTERING APPARATUS.

SPECIFICATION forming part of Letters Patent No. 518,102, dated April 10, 1894.

Application filed March 15, 1893. Serial No. 466,108. (No model.)

*To all whom it may concern:*

Be it known that I, ROBERT HAAG, a subject of the Emperor of Germany, residing at Stuttgart, Würtemberg, Germany, have invented certain new and useful Improvements in Wine or Beer Filtering Apparatus, of which the following is a specification.

The present invention relates to apparatus for filtering and drawing off beer and other liquids, and its object is to provide means for preventing back pressure of the beer in the filter when the draw-off cock or spigot is suddenly closed, and furthermore, to produce a regulating device which will permit the beer to be drawn off by an unskillful operator without unnecessary foaming of the beer.

Another object of my invention is to provide means whereby the beer may be conveniently inspected or examined after being filtered.

With these broad objects in view, and some specific objects which will be plain to those skilled in the art, my invention consists of such a combination of parts and details of construction as will first be described in connection with the accompanying drawings, and then particularly pointed out in the claims.

Figure 1:
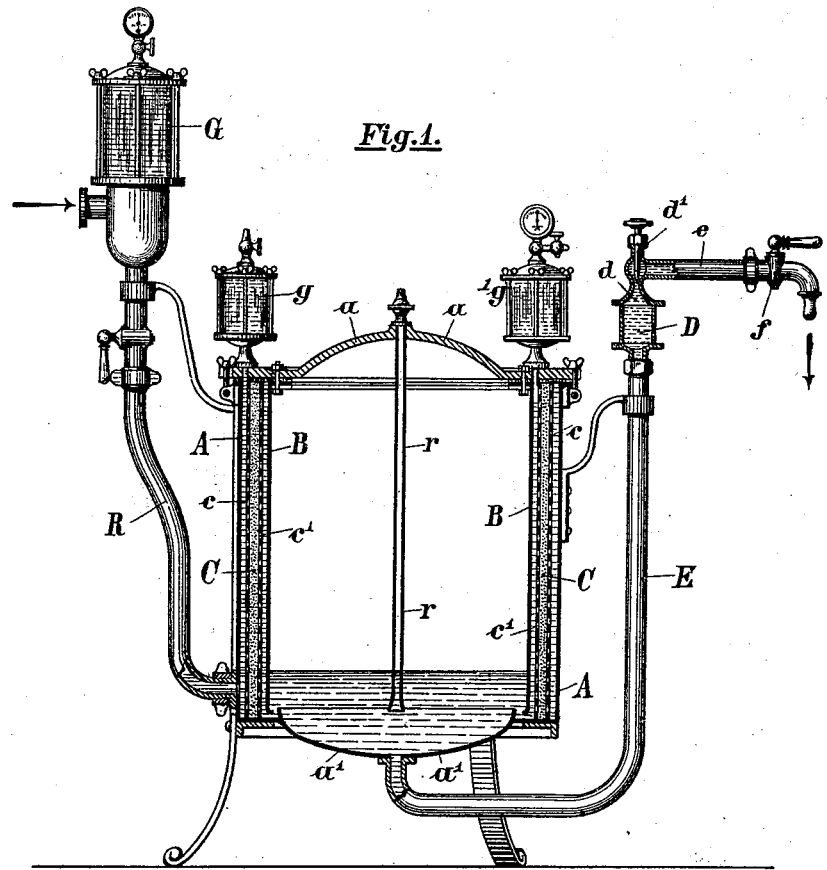
Figure 2:
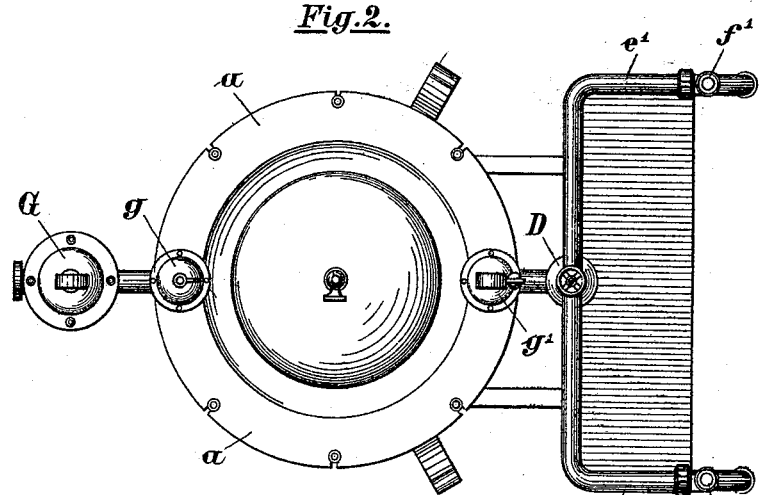

In the drawings accompanying this specification—Figure 1 represents a side elevation, partly in vertical section, of a beer-filtering apparatus, embodying my invention, and Fig. 2 a plan view thereof.

The filtering apparatus is cylindrical in form and consists of a receptacle, A, provided with an easily removable small lid, $a$. In this receptacle is arranged a smaller cylinder, B, secured to and depending from the lid, $a$, and extending not quite to the bottom, $a'$, of the receptacle, A.

Between the receptacle, A, and cylinder, B, is arranged the filtering cylinder, C, in which the filtering mass or material is secured between two perforated sheet-metal cylinders, $c$, and $c'$. Packing material is arranged between the upper and lower edges of the cylinder, C, and the lid, $a$, and bottom, $a'$, to hermetically seal the spaces on each side of the filtering cylinder. A sufficient annular space is formed between the filtering cylinder and the outer walls of the receptacle, A, to permit the access of the unfiltered beer, and a similar annular space is left between the filtering cylinder, C, and the cylinder, B, to permit the overflow of the filtered beer into the lower portion of the receptacle, A. The lower part of the receptacle, A, is provided with the concave bottom, $a'$, to whose lowest portion is attached the outlet-pipe, E, which leads to the outlet-cocks, $f$ and $f'$. The outlet-pipe is provided at an intermediate point with an urn, D, to whose top the service pipes, $e$ and $e'$, are preferably attached.

The top, $d$, of the urn, D, is provided with a regulating valve of the usual form, consisting of a screw, $d'$, provided with a conical point adapted to leave an annular outflow-opening around the same when properly adjusted. By raising or lowering the screw, $d'$, by means of a hand-wheel, the outflow-opening is increased or diminished, and the parts are so arranged that the valve cannot be completely closed.

A level regulating tube, $r$, is arranged in the interior of the receptacle, A, being secured to the lid, $a$, through which it passes, and provided above the lid with a cock at its upper end. The lower end of the level regulating tube is somewhat higher than the lower edge of the cylinder, B. When the unfiltered beer passes from the supply tube, R, into the annular space surrounding the filter, and through the filter, C, where it is filtered, it then passes through the space between the filter and the cylinder, B, and collects at the bottom of the receptacle, A, rising first to the projecting edge of the concave bottom, $a'$, and finally reaches the lower end of the level regulating tube, $r$. The cock of the level regulating tube is normally open when the filter is first put in operation, and, as soon as the filtered beer reaches the level of the lower end of the tube, $r$, the connection between the air in the interior of the filter and the outside air is shut off, wherefore the level of the filtered beer can only rise by compressing the air so imprisoned in the interior of the filter but it is still free to rise in the tube, $r$, which it does until it flows through the cock at the top of the tube, which is then closed. The continued flow of the beer into the filter compresses the air to such a pressure as is necessary to raise the filtered beer to the height of the outlet pipes, $e$. When the faucets, $f$, are opened to draw off the filtered beer, the latter flows out readily, and, if the faucets are closed suddenly, the air in the interior of the filter will act as a cushion, and the beer contained in the filter will not be driven back through the filtering material. The level regulating tube, r, may be moved up and down through the lid, a, in order to alter the level at which the beer may stand in the interior of the filter. The urns, G, g and g', are arranged on the supply pipe and on the lid of the receptacle, A, so as to communicate with the space within and outside of the filter, C, in the usual manner.

The urn, D, is provided with transparent walls to permit the inspection of the filtered beer.

The advantages of my filtering apparatus are essentially as follows:

First. By arranging the apparatus so that the filtered beer does not fill the entire receptacle, A, in flowing out, as in the apparatus heretofore employed, but so as to confine a body of air over the same causing the same to flow out through the tube, E, the injurious effect of the pressure exerted by the beer when the cock, f or f', is closed, is prevented. If the space between the cocks, f and f', and the filter, C, is completely filled with beer, as is the case in all filtering apparatus heretofore employed, a sudden closing of the cocks will force the beer backward against the filter, the liquid not being compressible. The consequence thereof is that the impurities separated by the filter will be taken up by the beer and render the same turbid.

Second. By employing an urn provided with a regulating valve with a conical point and an annular outlet opening instead of a regulating cock the outflow of the beer becomes more even, a change of the outflow controlling devices of the same is prevented whereby the foaming of the beer is obviated. Inasmuch as the beer completely fills the urn, an examination of the character of the filtered beer is facilitated.

What I claim, and desire to secure by Letters Patent, is—

1. In a beer-filtering apparatus, a beer receptacle, a filter within the receptacle, a smaller cylinder shorter than the receptacle extending to near the bottom of the same and located within the filter, a level-regulating pipe within the smaller cylinder, a supply pipe in communication with the receptacle, and an outlet pipe leading therefrom, whereby a body of air is retained above the surface of the liquid, substantially as described and for the purpose set forth.

2. In a beer-filtering apparatus, the combination with a receptacle, a beer supply pipe connected to the receptacle, a filtering cylinder within the receptacle, a smaller cylinder within the filtering cylinder and open at its lower end, and an outlet pipe connected to the bottom of the receptacle, substantially as described and for the purpose set forth.

3. In a beer-filtering apparatus, the combination with a beer receptacle, and a filtering cylinder within the receptacle, a lid removably attached to the receptacle, an interior cylinder shorter than the beer receptacle and suspended from the lid, and an outlet pipe connected with the bottom of the receptacle, substantially as described and for the purpose set forth.

4. In a beer-filtering apparatus, the combination with a receptacle, a supply pipe connected to the receptacle, a filtering cylinder whose exterior diameter is smaller than the interior diameter of the receptacle, a lid removably attached to the receptacle, an interior cylinder suspended from the lid, the said cylinder being shorter than the receptacle and having an exterior diameter smaller than the interior diameter of the filtering cylinder, a level-regulating tube passing through the lid, its lower end opening a short distance above the bottom of the receptacle, an air-cock on the upper end of the level-regulating pipe, a pair of urns on the lid, one in communication with the space between the filter and the exterior wall of the receptacle and the other in communication with the space between the filter and the interior cylinder, an outlet pipe connected to the bottom of the receptacle, a transparent urn attached to the upper end of the outlet pipe, a non-closable adjustable regulating valve on the top of the urn, a service pipe into which the regulating valve opens, and a faucet on the service pipe, substantially as described and for the purpose set forth.

In testimony that I claim the foregoing as my invention I have signed my name in presence of two subscribing witnesses.

ROBERT HAAG.

Witnesses:
AUGUST B. GRAUTZ,
BERNHARD HOFMANN.